United States Patent
Baz

(10) Patent No.: US 10,055,253 B2
(45) Date of Patent: Aug. 21, 2018

(54) REDUCING PROCESSOR LOADING DURING HOUSEKEEPING OPERATIONS

(71) Applicant: Mellanox Technologies Ltd., Yokneam (IL)

(72) Inventor: Itai Baz, Haifa (IL)

(73) Assignee: Mellanox Technologies, Ltd., Yokneam (IL)

(*) Notice: Subject to any disclaimer, the term of this patent is extended or adjusted under 35 U.S.C. 154(b) by 586 days.

(21) Appl. No.: 14/224,272

(22) Filed: Mar. 25, 2014

(65) Prior Publication Data

US 2015/0277970 A1  Oct. 1, 2015

(51) Int. Cl.
*G06F 9/48* (2006.01)

(52) U.S. Cl.
CPC .................. *G06F 9/4887* (2013.01)

(58) Field of Classification Search
CPC .............. G06F 9/48; G06F 9/46; G06F 9/44
USPC ......................................................... 718/102
See application file for complete search history.

(56) References Cited

U.S. PATENT DOCUMENTS

| | | | |
|---|---|---|---|
| 5,926,649 A * | 7/1999 | Ma et al. ........................ 710/6 |
| 2006/0112093 A1* | 5/2006 | Lightstone ........ G06F 17/30315 |
| 2006/0168571 A1* | 7/2006 | Ghiasi ..................... G06F 9/505 |
| | | | 717/127 |
| 2011/0161963 A1* | 6/2011 | Guevorkian .......... G06F 9/4887 |
| | | | 718/102 |
| 2012/0122463 A1* | 5/2012 | Chen et al. ................... 455/450 |
| 2012/0167118 A1* | 6/2012 | Pingili et al. ................ 719/318 |
| 2013/0007470 A1* | 1/2013 | Violleau ................ G06F 21/54 |
| | | | 713/193 |
| 2014/0357297 A1* | 12/2014 | Futaki ....................... 455/456.1 |
| 2015/0007173 A1* | 1/2015 | Ionescu ............. G06F 9/45533 |
| | | | 718/1 |

FOREIGN PATENT DOCUMENTS

EP  1862020 B1  7/2013
JP  2005312238 A  11/2005

OTHER PUBLICATIONS

Audsley et al, On fixed priority scheduling, offsets and co-prime task periods, 1998, Elsevier Science B.V. Information Processing Letters 67 (1998) 65-69.*

Krithi Ramamritham, Allocation and Scheduling of Complex Periodic Tasks, 1990 IEEE, CH2878-7/90/0000/0108.*

Cucu et al, Non-preemptive multiprocessor scheduling of strict periodic systems with precedence constraints, Nov. 18, 2004, www.ulb.ac.be/di/ssd/cucu/plansig04.pdf.*

* cited by examiner

*Primary Examiner* — Li B Zhen
*Assistant Examiner* — Daniel Wei
(74) *Attorney, Agent, or Firm* — D. Kligler IP Services Ltd.

(57) ABSTRACT

A method includes, in a processor, receiving first and second operations for periodic execution with respective specified time periods. Respective actual time periods having no common divisor are derived from the specified time periods. The first and second operations are executed periodically with the respective actual time periods.

8 Claims, 3 Drawing Sheets

REDUCING PROCESSOR LOADING DURING HOUSEKEEPING OPERATIONS

FIELD OF THE INVENTION

The present invention relates generally to computing systems, and particularly to methods and systems for reducing processor loading during housekeeping operations.

SUMMARY OF THE INVENTION

An embodiment of the present invention provides a method including, in a processor, receiving first and second operations for periodic execution with respective specified time periods. Respective actual time periods having no common divisor are derived from the specified time periods. The first and second operations are executed periodically with the respective actual time periods.

In some embodiments, deriving the actual time periods includes choosing respective prime number time periods nearest to the specified time periods. In other embodiments, the first and the second operations have execution times shorter than the respective specified time periods. In yet other embodiments, the first and second operations include housekeeping tasks of the processor.

In some embodiments, the method includes estimating results of the first operation at the specified time periods by interpolating the results of the first operation at the actual time periods. In other embodiments, the method includes outputting the estimated results to a user.

There is also provided, in accordance with an embodiment of the present invention, an apparatus including an interface and a processor. The interface is configured to receive first and second operations for periodic execution with respective specified time periods. The processor is configured to derive from the specified time periods respective actual time periods having no common divisor, and to execute the first and second operations periodically with the respective actual time periods.

The present invention will be more fully understood from the following detailed description of the embodiments thereof, taken together with the drawings in which:

DETAILED DESCRIPTION OF EMBODIMENTS

Overview

Embodiments of the present invention that are described herein provide improved methods and systems for executing periodic tasks in computing systems. The embodiments described herein refer mainly to periodic housekeeping tasks, but the disclosed techniques can be used with any other suitable type of periodic operation.

In the disclosed embodiments, a processor receives multiple housekeeping tasks for execution, with respective specified time periods. During execution, there is some probability that two or more tasks will coincide and temporarily load the processor. A temporary load of this sort may degrade the processor performance, with regard to the periodic tasks as well as other tasks that the processor is to perform.

In some embodiments that are described herein, the processor reduces the occurrence probability of such scenarios by modifying the specified time periods of the periodic tasks. Typically, the processor derives from the specified time periods respective actual time periods, which have no common divisor. In an example embodiment, the processor sets the actual time period of a given task to be the prime number nearest to the specified time period. The processor then executes the periodic tasks with the actual time periods instead of the specified time periods. This choice of time periods reduces the likelihood that the processor will have to execute different periodic tasks simultaneously. As a result, temporary loading of the processor is mitigated.

System Description

Figure 1:
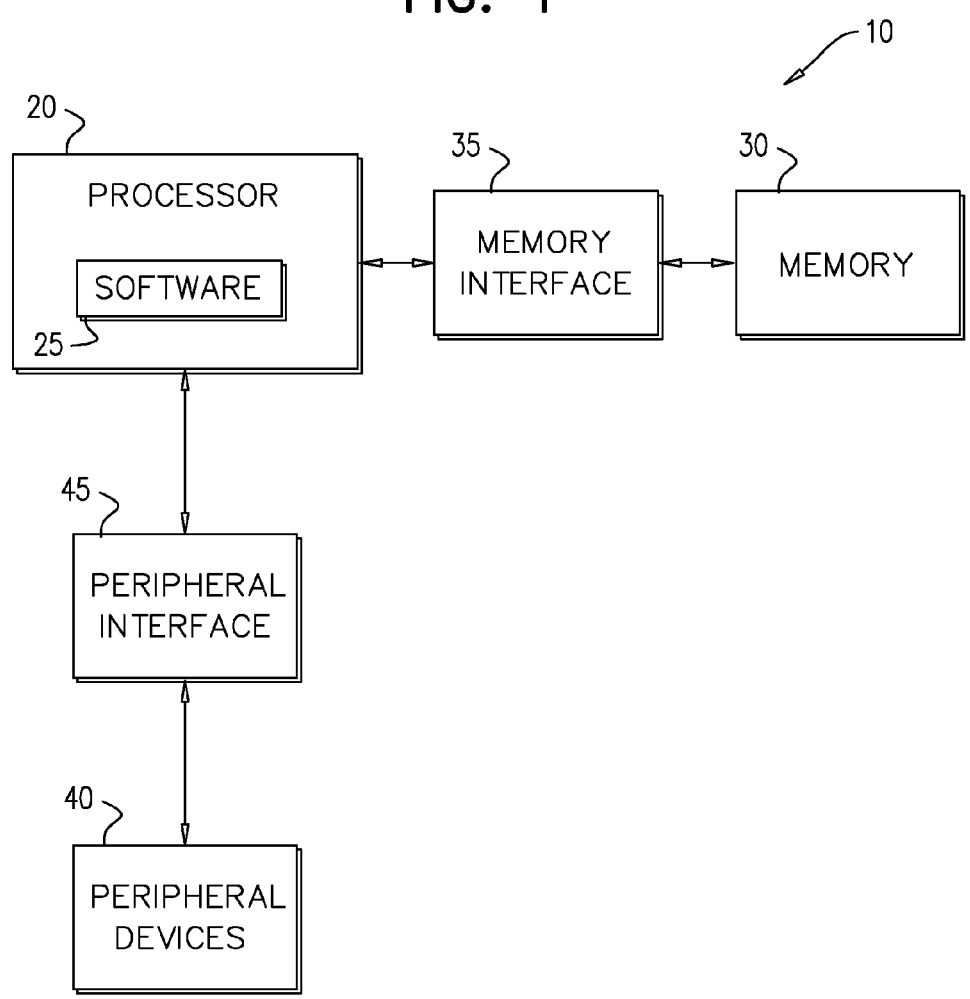
FIG. 1 is a block diagram that schematically illustrates a computer system, in accordance with an embodiment of the present invention.

FIG. 1 is a block diagram that schematically illustrates a computer system 10, in accordance with an embodiment of the present invention. System 10 comprises a processor 20, a memory 30, and one or more peripheral devices 40. Processor 20 communicates with memory 30 via a memory interface 35 and with peripheral devices 40 via a peripheral interface 45. Software 25 for running housekeeping operations in processor 20 may be stored in memory 30 that is uploaded to processor 20. Similarly, software 25 may be stored in any suitable peripheral device and uploaded to processor 20 for execution.

Peripheral devices 40 may be comprise, for example, a solid state drive (SSD), keyboard, mouse, expansion cards, graphic cards, image scanners, or any other suitable device. Software 25 may specify that processor 20 is to periodically execute housekeeping tasks, for example in a peripheral device, in memory 30 or internally in the processor.

In an example embodiment, system 10 comprises a communication device such as a network switch, or a compute node such as a server. Alternatively, however, the disclosed techniques can be used in any suitable system that comprises a processor. Typically, processor comprises a general-purpose computer, which is programmed in software to carry out the functions described herein. Software 25 may be downloaded to the computer in electronic form, over a network, for example, or it may, alternatively or additionally, be provided and/or stored on non-transitory tangible media, such as magnetic, optical, or electronic memory. Computer system 10 is shown merely for conceptual clarity and not by way of limitation of the embodiments of the present invention.

Reducing Processor Loading by Executing Housekeeping Operations with Time Periods Having No Common Divisor Housekeeping tasks comprise operations, such as for example, garbage collection in storage, freeing local memory, backup and/or removal of un-needed files and software, collecting statistics in the computer system, and execution of disk storage maintenance utilities (e.g., defragmenters, virus scanners, scandisk routines, etc.). When two or more housekeeping operations are scheduled to be executed simultaneously (possibly in addition to the execution of regular tasks), processor 20 may become loaded and slow to respond.

In many computer systems such as in embedded systems, processor 20 is relatively weak in processing power. In such cases, overtasking system 10 with additional housekeeping tasks further loads processor 20 and reduces the responsiveness of system 10 to the user. The embodiments presented herein, however, may be applied to server systems and generally to processors of any computational power.

Figure 2A:
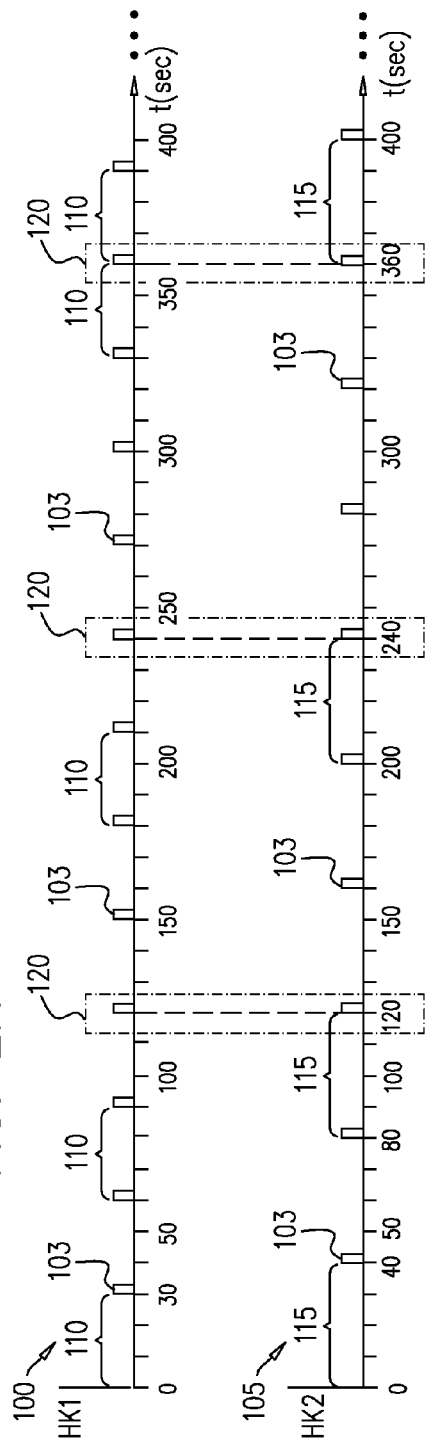
FIGS. 2A and 2B are timing diagrams that illustrate a method for reducing processor loading during housekeeping operations, in accordance with an embodiment of the present invention.
Figure 2B:
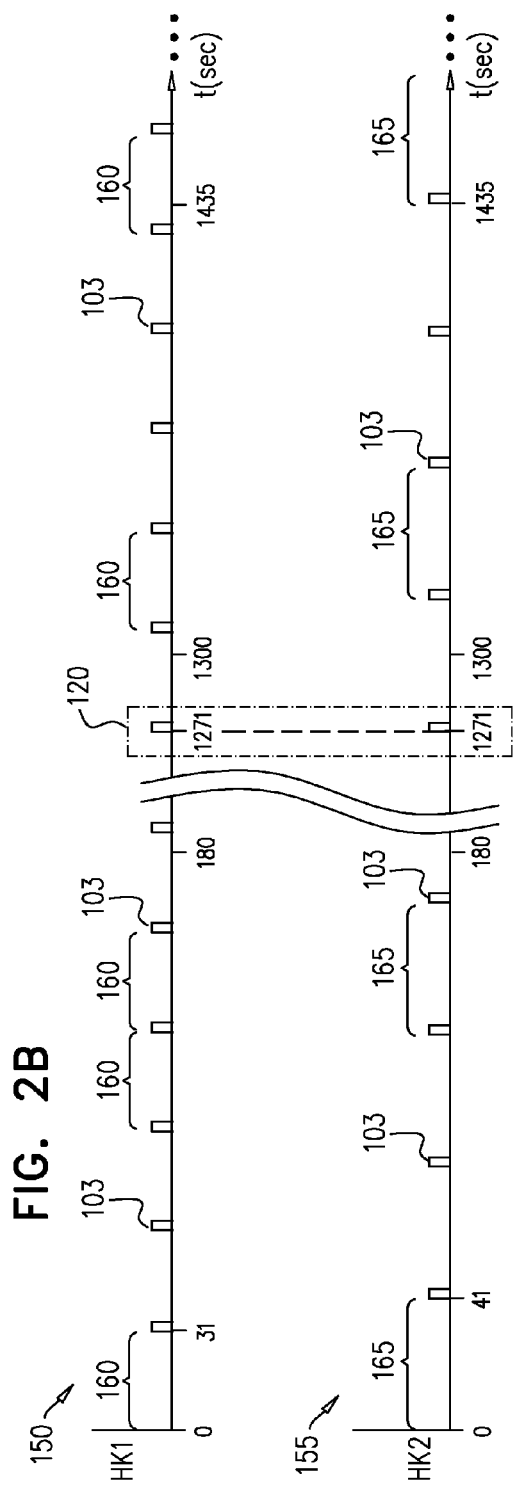

FIGS. 2A and 2B are timing diagrams that illustrate a method for reducing processor loading during housekeeping operations, in accordance with an embodiment of the present invention. Consider an exemplary embodiment of two housekeeping tasks denoted HK1 and HK2. The two housekeeping tasks have occurrences denoted 103 in a first timing diagram 100 and a second time diagram 105, respectively as shown in FIG. 2A. HK1 has a first specified period 110 of thirty seconds in timing diagram 100.

Stated differently, processor 20 initiates the execution of HK1 every 30 seconds in this example, with an execution time much smaller than period 110 of 30 seconds. Similarly, HK2 has a second specified period 115 of 40 seconds in timing diagram 105, with an execution time much smaller than 40 seconds.

In that the values of 30 seconds and 40 seconds of the specified time periods 110 and 115, respectively, numerically have common divisors of 2, 3 and 5, the two housekeeping processes first overlap in an overlap region 120 at 120 seconds, 240 seconds, and 360 seconds in FIG. 2A, which are integer multiples of 120. Processor 20 is required to initiate execution of both housekeeping processes HK1 and HK2 at 120 seconds, 240 seconds, 360 seconds . . . N*120 seconds, where N is an integer 1, 2, 3, . . . .

Note that the execution times of the housekeeping operations HK1 and HK2 can be orders of magnitude smaller than the first and second specified periods 110 and 115, typically on the order of milliseconds. However for the exemplary embodiment shown in FIG. 2A, any other housekeeping tasks, in addition to HK1 and HK2, that have specified time periods related to the common divisors for two specified periods 30 and 40 seconds, e.g., 2, 3, 6, 12, 15, 20 seconds etc., will have also overlap with HK1 and HK2 at 120, 240, 360 seconds. Thus, in such a scenario, processor 20 will initiate execution of all of these processes simultaneously at 120 seconds, 240 seconds, . . . N*120 seconds and be severely loaded.

In the embodiments of the present invention, processor 20 executes the housekeeping operations with actual time periods having no common divisor that are derived from the specified time periods, pushing the first instance of overlap time 120 further ahead in time. In this case, the first instance of overlap 120 occurs at a time equal to the product of the actual time periods for the two or more housekeeping operations.

In some embodiments, processor 20 assigns the actual time period as the nearest prime number period closest to the specified time periods, which is illustrated in FIG. 2B. Processor 20 derives, or identifies, the nearest prime number period of first and second housekeeping operation of 30 and 40 seconds (e.g., time periods 110 and 115) as 31 and 41 seconds, respectively.

Processor 20 periodically executes the first housekeeping task HK1 shown in a timing diagram 150 with a time period 160 of 31 seconds instead of 30 seconds. Similarly, processor 20 periodically executes the second housekeeping task HK2 shown in a timing diagram 155 with a time period 165 of 41 seconds instead of 40 seconds. (Again, in both diagrams the task occurrences are denoted 103.) As a result, the time periods 160 and 165 of 31 seconds and 41 seconds, respectively, as prime numbers, have no common divisor.

The first instance of overlap 120 as shown in FIG. 2B is 1271 seconds (e.g., 31*41 seconds). Hence, periodic overlap of housekeeping operations in this exemplary example shown in FIG. 2B occurs every N*1271 seconds instead of N*120 seconds as in FIG. 2A. When system 10 assigns time periods with no common divisor to the two or more housekeeping operations for periodic execution in this manner, the loading on processor 20 is significantly reduced.

The embodiments shown in FIGS. 2A and 2B are merely for conceptual clarity and not by way of limitation of the embodiments of the present invention. Any number of housekeeping operations may be implemented with any suitable time period for initiating periodic execution of the housekeeping operations. The housekeeping operations may comprise any suitable execution time, and each housekeeping operation may have a different execution time relative to the other housekeeping operations.

In some embodiments, the housekeeping tasks can be executed periodically with the actual time periods having no common divisor without affecting the performance of the housekeeping tasks. These housekeeping tasks may be, for example, background tasks not exposed to the user.

However, some housekeeping tasks are based on an industry standard, or are otherwise required to be performed with a specific time period that should not be changed. For example, software 25 may specify collection of interface counter statistics every 60 seconds as per a industry standard. In some embodiments, processor 20 executes such housekeeping tasks with the actual (modified) time periods, and then estimates the results that would have been obtained using the specified time periods.

In an example embodiment, the processor executes task HK1 every integer multiple of the nearest prime number time interval to 60 seconds (e.g., every 61 seconds). After executing the housekeeping operation, processor 20 interpolates the results (e.g., counter values) obtained at the actual time periods (e.g., 61 seconds), in order to extract the results that would have been obtained at the specified time periods (e.g., 60 seconds). The estimated (interpolated) results may then be output to the user.

Figure 3:
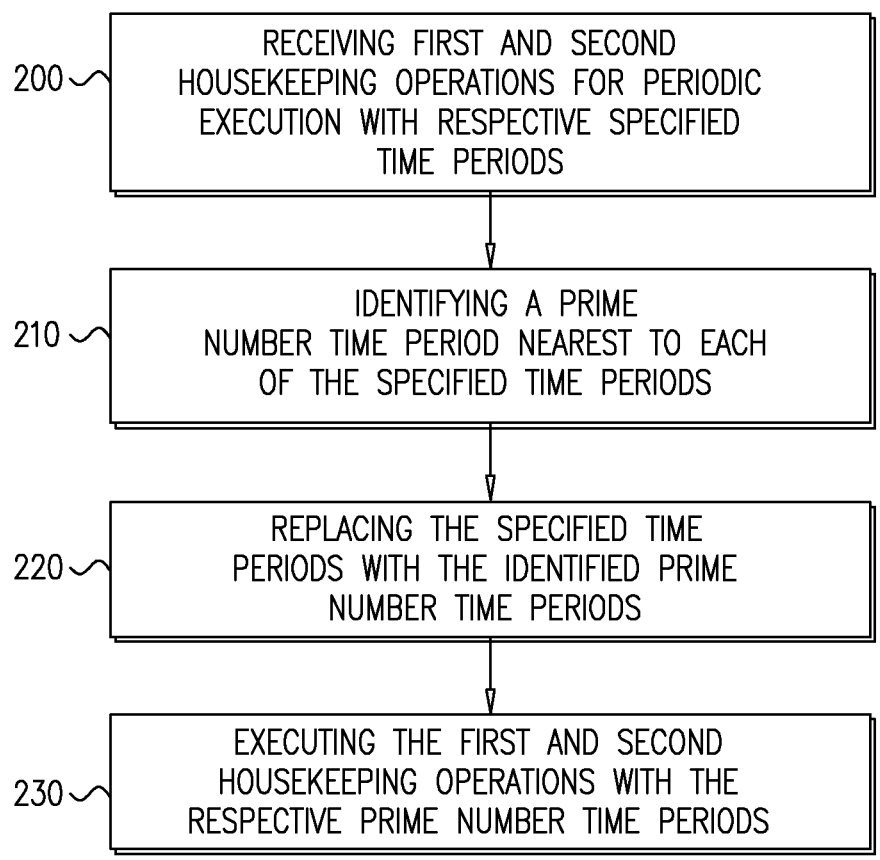
FIG. 3 is a flow chart that schematically illustrates a method for reducing processor loading during housekeeping operations, in accordance with an embodiment of the present invention.

FIG. 3 is a flow chart that schematically illustrates a method for reducing processor loading during housekeeping operations, in accordance with an embodiment of the present invention. In a receiving step 200, processor 20 receives a first and a second housekeeping operation for periodic execution with respective specified time periods. In an identifying step 210, processor 20 identifies a prime number time period nearest to each of the specified time periods as illustrated in the exemplary example of FIG. 2B. In a replacing step 220, processor 20 replaces the specified time periods with the identified prime number time periods. In an executing step 230, processor 20 executes the first and second housekeeping operations with the respective prime number time periods.

Although the embodiments described herein mainly address periodic housekeeping tasks in computer systems, the methods and systems described herein can also be used in other applications, such as in periodic data mining, rendering, and data processing operations in computer systems.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
   in a processor, receiving first and second operations for periodic execution with respective first and second specified time periods;
   deriving from the first and second specified time periods respective first and second actual time periods, by choosing respective prime number time periods nearest to the specified time periods, wherein at least the first specified time period is different from the first actual time period;
   executing the first and second operations periodically with the respective first and second actual time periods;
   estimating results of the first operation at the specified time periods by interpolating the results of the first operation at the actual time periods; and
   outputting the estimated results, wherein the first operation comprises a task for collecting statistics in a computer system of the processor,
   wherein the first and second operations comprise housekeeping tasks of the processor.

2. The method according to claim 1, wherein the first and the second operations have execution times shorter than the respective specified time periods.

3. An apparatus, comprising:
   a memory storing software for running operations; and
   a processor, which is configured to receive indications of first and second operations for periodic execution with respective first and second specified time periods and to derive from the first and second specified time periods respective first and second actual time periods, by choosing respective prime number time periods nearest to the specified time periods, wherein at least the first specified time period is different from the first actual time period, to execute the first and second operations periodically with the respective first and second actual time periods, using software stored in the memory, to estimate results of the first operation at the specified time periods by interpolating the results of the first operation at the actual time periods, and to output the estimated results,
   wherein the first and second operations comprise housekeeping tasks of the processor.

4. The apparatus according to claim 3, wherein the first and the second operations have execution times shorter than the respective specified time periods.

5. The apparatus according to claim 3, wherein the first operation comprises a task for collecting statistics in a computer system of the processor.

6. The apparatus according to claim 3, wherein the first operation comprises a disk storage maintenance utility.

7. The apparatus according to claim 3, wherein the first operation comprises a task for collection of interface counter statistics.

8. The method according to claim 1, wherein the first operation comprises a task for collection of interface counter statistics.

* * * * *